C. M. GAUTIER.
METALLIC FABRIC SUITABLE FOR PNEUMATIC TIRES OF MOTOR CARS AND OTHER CARRIAGES.
APPLICATION FILED AUG. 20, 1906.
978,731. Patented Dec. 13, 1910.
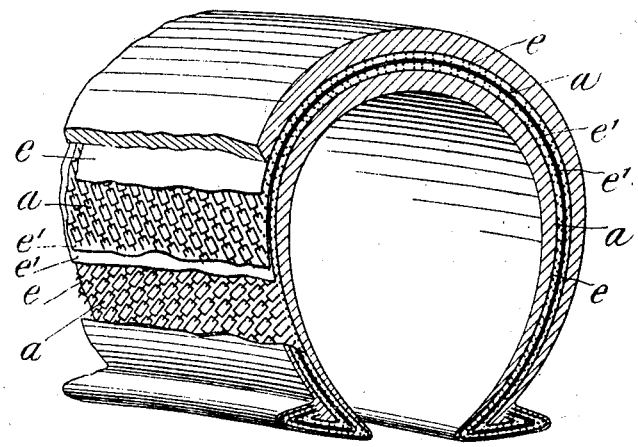
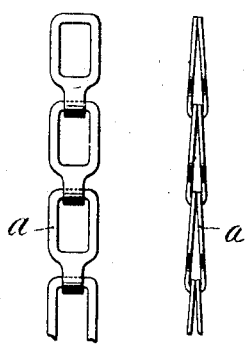
 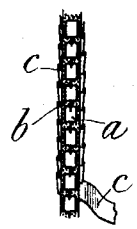  
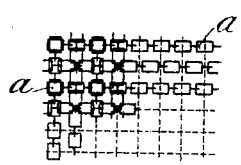 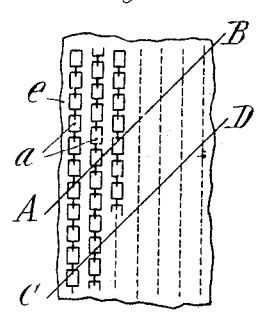 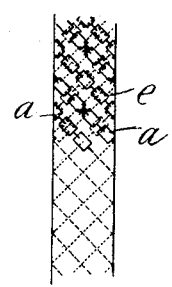
Witnesses.
Jesse N. Lutton.
Inventor.
Claude Marie Gautier
by Atty.

UNITED STATES PATENT OFFICE.

CLAUDE MARIE GAUTIER, OF LEWISHAM, LONDON, ENGLAND.

METALLIC FABRIC SUITABLE FOR PNEUMATIC TIRES OF MOTOR-CARS AND OTHER CARRIAGES.

978,731.

Specification of Letters Patent. Patented Dec. 13, 1910.

Application filed August 20, 1906. Serial No. 331,329.

*To all whom it may concern:*

Be it known that I, CLAUDE MARIE GAUTIER, citizen of the Republic of France, resident of 11 Overcliffe road, Lewisham, London, S. E., Great Britain, engineer, have invented certain new and useful Improvements in Metallic Fabric Suitable for Pneumatic Tires of Motor-Cars and other Carriages; and I do hereby declare the following to be a full, clear, and exact description of the invention, such as will enable others skilled in the art to which it appertains to make and use the same.

This invention relates to a metallic articulated thread designed to be used in manufacturing pneumatic tires with a view of strengthening same, either in the form of wires simply laid side by side or in the form of woven fabrics.

It is now recognized that the present construction of pneumatic tires leaves much to be desired on account of the fabric employed being of insufficient strength especially in the case of motor cars, unless such a quantity is used as very materially destroys the resiliency of the tire. The tensile strength obtainable with fabrics at present used is limited and therefore the requisite strength can only be obtained by increasing either the thickness of the fabric or the number of layers. The result is a tire which is not only very rigid but which cuts very rapidly. It is likewise known that cotton fabrics which are the most capable of resisting the action of heat lose 15% of their resistance on being subjected to the heat necessary for vulcanization. Further, tires constructed of cotton and like fabrics have the disadvantage that the rubber soon becomes so porous as to allow moisture to gain access to the fabric which consequently soon becomes rotten resulting in the destruction of the tire.

I am aware that attempts have already been made to employ a metallic fabric in the construction of pneumatic tires, but so far without success. The chief difficulties have been, first, to obtain a metal fabric that will flex without breaking; second to obtain complete and perfect cohesion between the metallic fabric and the rubber; and third, to prevent the destruction of the metal fabric by the action of the sulfur employed in the process of vulcanization.

The annexed drawing permits of a ready comprehension of my invention, wherein,

Figures 1 and 2 are front and edge elevations respectively of one form of mail which may be employed. Fig. 3, shows a chain along which is wound a cotton cord. Fig. 4, represents the same chain wound with cotton cord and surrounded with a thin rubber band. Fig. 5, shows a chain on which a rubber band is wound directly. Fig. 6, shows a chain covered with a plastic or adhesive material. Fig. 7, represents a tissue form of interlaced chains. Fig. 8, shows the chains placed side by side between a fabric from which a bias strip may be cut. Fig. 9, shows the superposition of two similar bands in which the chains cross one another in order to produce a bias strip for pneumatic tires. Fig. 10 is a transverse section of Fig. 9, and Fig. 11, is a view partly in section and partly broken away of a pneumatic tire composed of two sheets of articulated fiber of the kind shown in Figs. 8, 9, and 10.

According to the present invention, I construct the fabric not of a single wire, but of what I call an articulated metallic thread. This consists of a very light and flexible chain $a$ of steel or other suitable metal preferably inclosed in a sheath $b$ of cotton or like textile material as shown in Fig. 3. The sheath $b$ may be proofed with rubber or other adhesive material $c$ wound in a spiral around the sheath as shown in Fig. 4, both for the purpose of making the wrapping homogeneous and for the purpose of enabling the rubber forming the exterior of the tire to adhere to it. The sheath may be formed by winding the rubber band $c$ directly on the chain as shown in Fig. 5, said wrapping of rubber being free of sulfur or other vulcanizing substance capable of injuring the metal by forming a sulfid or otherwise. As an alternative construction, the chain may be wrapped or embedded directly in a cover or sheath of rubber or other adhesive substance $d$ as shown in Fig. 6, free from sulfur or other injurious material as above stated, a convenient method of effecting this being to pass it through a vat of rubber in solution a sufficient number of times,—allowing it to dry between each dipping—to give it a coating of the desired thickness. It may also be finally drawn through a die which will compress the rubber into the interstices of the chain, remove any excess of rubber, and give the thread a uniform section.

The articulated metallic thread constructed in the manner hereinbefore described when employed in the construction of pneumatic tires is so disposed that the load carried by the tire is entirely borne by said metallic thread. To this end it can either be woven into a fabric in the ordinary manner using the said thread either for both the warp and the woof as shown in Fig. 7, or for one and a cotton or like thread for the other, or alternatively the articulated metallic thread may be employed in the manner well known in the construction of so-called thread tires in which the fabric is made up by laying or winding the thread in layers over one another the threads in one layer crossing the ones in the adjacent layer, as shown in Fig. 9 in contra-distinction to interweaving them. This method may be employed either in directly building up tires or in the preparation of sheets of fabric for such purpose. In constructing such sheets I place a number of lengths of chain $a$ side by side parallel to one another at a suitable distance apart between two sheets of rubber $e, e'$. These sheets may be cut along the lines A—B and C—D, Fig. 8, in order to obtain a strip in which the chains are disposed obliquely. Said sheets may be pressed together by passing them through a pair of rolls or otherwise, so as not only to cause them to firmly adhere to one another but also to force the rubber into the interstices of the chains. In all cases the articulated metallic thread is incorporated or made integral with the beads or their equivalent on the edges of the cover of the tire.

The strengthening sheets constructed as above described and shown in Figs. 7 to 10 are, as shown in Fig. 11, interposed between an inner strip A and an outer strip B both of which may be made of rubber or of a suitable textile fabric as desired.

I wish it to be understood that according to this invention, the articulated metallic thread can be used either sheathed with protective or insulating covering, or unsheathed, as may be desired; and further that the insulating covering may be of any suitable adhesive not containing sulfur or other material injurious to the metal of the chains, that is to say it need not contain rubber at all, but if it is a rubber compound it should be free of injurious substances; moreover when the articulated metallic thread is employed to build up flexible sheets for use in the manufacture of tires, the sheets need not be of rubber compound, for any suitable compound that is non injurious and adhesive will do.

While a tire made in this manner offers great resistance to puncture, I wish to establish a clear distinction between my system and the various so-called non-puncturable covers or tires at present in use or that have been previously described.

I claim:—

1. A strengthening sheet to be interposed between the inner and outer rubber strips of pneumatic tire casings, comprising a series of chain lengths laid in rows and means to protect the chain lengths from the action of the sulfur in the rubber.

2. A strengthening sheet composed of a series of chain lengths each inclosed in a sheath of textile material and laid in parallel rows between sheets of rubber.

3. A strengthening sheet composed of a series of chain lengths laid in parallel rows between sheets of rubber and disposed obliquely to the lengths of rubber sheets.

4. A strengthening sheet composed of two series of superposed chain lengths laid in parallel rows between sheets of rubber and disposed obliquely to the length of the rubber sheets, the chains of one series crossing those of the other series.

5. A strengthening sheet for pneumatic tires, comprising a plurality of series of flat metal chain lengths, the lengths of one series being in angular relation to those of the adjacent series.

6. A strengthening sheet for pneumatic tires comprising flat metallic chains embedded in a flexible protecting material, a strip of rubber wound in a spiral around each layer of flexible material, said chains being disposed in cross rows and embedded in layers of rubber.

In testimony that I claim the foregoing as my invention, I have signed my name in presence of two subscribing witnesses.

CLAUDE MARIE GAUTIER.

Witnesses:
FREDK. L. RAND,
ALFRED NUTTING.